United States Patent
Song

(10) Patent No.: US 8,704,983 B2
(45) Date of Patent: Apr. 22, 2014

(54) LCD PANEL, LCD DEVICE, AND MANUFACTURING METHOD THEREOF

(75) Inventor: Yu Song, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 207 days.

(21) Appl. No.: 13/378,783

(22) PCT Filed: Dec. 6, 2011

(86) PCT No.: PCT/CN2011/083587
§ 371 (c)(1),
(2), (4) Date: Dec. 16, 2011

(87) PCT Pub. No.: WO2013/082766
PCT Pub. Date: Jun. 13, 2013

(65) Prior Publication Data
US 2013/0141682 A1    Jun. 6, 2013

(30) Foreign Application Priority Data

Dec. 5, 2011    (CN) .......................... 2011 1 03980046

(51) Int. Cl.
*G02F 1/1337*    (2006.01)
(52) U.S. Cl.
USPC ........................................ 349/123; 349/125
(58) Field of Classification Search
USPC ................................................ 349/123, 125
See application file for complete search history.

(56) References Cited

U.S. PATENT DOCUMENTS

2008/0252835 A1* 10/2008 Motomatsu et al. .......... 349/129

FOREIGN PATENT DOCUMENTS

| CN | 101285968 A | 10/2008 |
| CN | 101285968 A | 10/2008 |
| CN | 101697044 A | 4/2010 |
| CN | 101738787 A | 6/2010 |
| JP | 10153781 A | 6/1998 |
| JP | 2003222887 A | 8/2003 |
| JP | 2005283693 A | 10/2005 |
| JP | 200678930 A | 3/2006 |

OTHER PUBLICATIONS

Song Ziling, The first office action, May 2013, CN.
Li Jiantao, The International Searching Authority written comments, Sep. 2012, CN.

* cited by examiner

*Primary Examiner* — Phu Vu
(74) *Attorney, Agent, or Firm* — IPro, Inc.; Na Xu

(57) ABSTRACT

The invention discloses an LCD panel, an LCD device, and a manufacturing method thereof. The LCD panel comprises substrate(s); the substrate is provided with an oriented film and a frame adhesive, and the frame adhesive is formed on the periphery of the oriented film; the oriented film comprises an ordinary oriented film covering the effective display area and a porous oriented film arranged around the edge of the ordinary oriented film for adsorbing the impurities in the frame adhesive area. The oriented film in the LCD panel of the invention comprises a porous oriented film; the porous oriented film can absorb the foreign particles produced by the frame adhesive to prevent the impurities in the frame adhesive area from permeating into the effective display area, can effectively prevent the impurities produced by the frame adhesive from permeating into the effective display area to become liquid crystal pollutants, and can avoid pixel to produce stains or non-uniform display.

11 Claims, 3 Drawing Sheets

LCD PANEL, LCD DEVICE, AND MANUFACTURING METHOD THEREOF

TECHNICAL FIELD

The invention relates to the field of components of electronic products, and more particularly to a liquid crystal display (LCD) panel, an LCD device, and a manufacturing method thereof.

BACKGROUND

As shown in FIG. 1, an LCD panel generally includes a lower color film (CF) substrate 13, a thin-film transistor (TFT) substrate 11, a liquid crystal 12, filter(s) 142, an upper polaroid (not shown in the figure) and the like. The liquid crystal 12 is arranged between the TFT substrate 11 and the CF substrate 13. The TFT substrate 11 and the CF substrate which are in contact with the liquid crystal are coated with a layer of oriented film 14, respectively. The oriented films 14 are used for limiting the oriented state of the molecules of the liquid crystal 12. After the liquid crystal 12 is filled between the TFT substrate 11 and the CF substrate 13, the bonding sealing is accomplished by a frame adhesive 15. A lower polaroid is bonded to the bottom surface of the TFT substrate 11. An upper polaroid is bonded to the top surface of the CF substrate 13. Thus, an LCD panel is finally formed.

The oriented films 14 are coated on the corresponding substrates by a printer. The oriented films 14 are covered on the effective display areas of the LCD panel. Take the CF substrate as shown in FIG. 2 as an example, the A.A area is an effective display area, and the oriented film 14 should cover the A-A area, but the oriented film 14 can not cover the position coated with frame adhesive 15. When applying a voltage to the LCD panel, the frame adhesive 15 can produce impurities which permeate into the effective display area 142 and become liquid crystal pollutants. The liquid crystal pollutants are adsorbed on the oriented film 14 so that the pixel here can produce stains or non-uniform display.

SUMMARY

In view of the aforementioned problems, the aim of the invention is to provide an LCD panel, an LCD device, and a manufacturing method thereof capable of preventing impurities produced by the frame adhesive from permeating into the effective display areas.

In addition, the invention provides a manufacturing method for the LCD device.

To solve the technical problems, the invention uses a technical scheme: an LCD panel, comprises: substrate(s); the substrate is provided with an oriented film and a frame adhesive, and the frame adhesive is formed on the periphery of the oriented film; the oriented film comprises an ordinary oriented film covering an effective display area and a porous oriented film arranged around the edge of the ordinary oriented film for adsorbing impurities of the frame adhesive area.

Preferably, the thickness of the porous oriented film is more than the thickness of the ordinary oriented film. Thus, a thick porous oriented film can be made to effectively adsorb foreign particles.

Preferably, a spacing area is arranged between the porous oriented film and the effective display area of the LCD panel, to ensure that the foreign particles cannot permeate into the effective display area of the LCD device.

Preferably, the frame adhesive is formed on the periphery of the porous oriented film, and a gap is formed between the frame adhesive and the porous oriented film, to prevent the oriented liquid from diffusing into the frame adhesive area in the process of coating the oriented film.

An LCD device comprises the aforementioned LCD panel.

A manufacturing method of the LCD device, comprises the following steps:

A: Forming an oriented film on a substrate of an LCD panel; and

B: Treating the edge of the formed oriented film to form a porous oriented film.

Preferably, in the step B, the edge of the oriented film is treated by plasma. By treating the oriented film by plasma, the porous oriented film can be formed. The method is simple and feasible, and does not damage other structures.

Preferably, in the step A, the boundary of the oriented film is formed outside the boundary of the film at the bottom of the oriented film to from a thick alignment film at the edge of the oriented film. The benefit is that a thick porous oriented film can be made so the oriented film can effectively adsorb foreign particles.

Preferably, in the step B, a thicker film at the edge of the ordinary oriented film is treated to form a porous oriented film. Forming the thicker porous oriented film is beneficial to increase the adsorptive capacity of the porous oriented film to impurities.

Preferably, before the step B, the area of the oriented film which is not necessary to be treated is covered and masked. Masking the area which is not necessary to be treated can protect ordinary oriented film and avoid influencing the alignment effect of the ordinary oriented film.

Advantages of the invention are summarized as follows: the oriented film in the LCD panel of the invention comprises a porous oriented film; the porous oriented film can absorb the foreign particles produced by the frame adhesive to prevent the impurities in the frame adhesive area from permeating into the effective display area, can effectively prevent the impurities produced by the frame adhesive from permeating into the effective display area to become liquid crystal pollutants, and can avoid pixel to produce stains or non-uniform display.

DETAILED DESCRIPTION

The technology, the structural feature and the aim and effect achieved of the invention will be described in detail in accordance with the examples and the figures.

Figure 1:
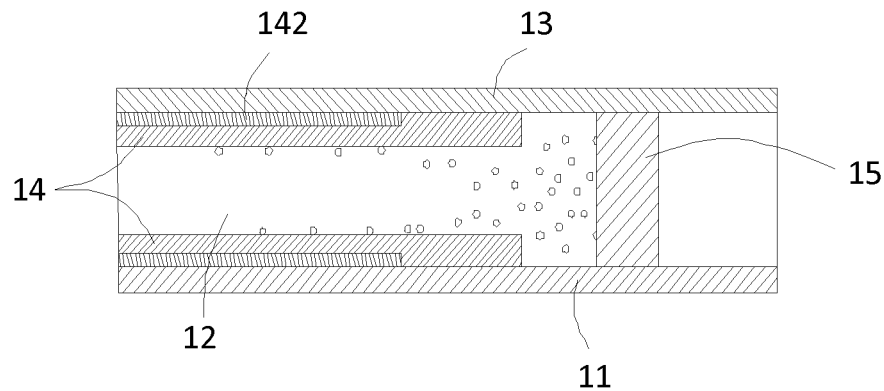
FIG. 1 is a cross-section diagram of a partial structure of an existing LCD panel.
Figure 2:
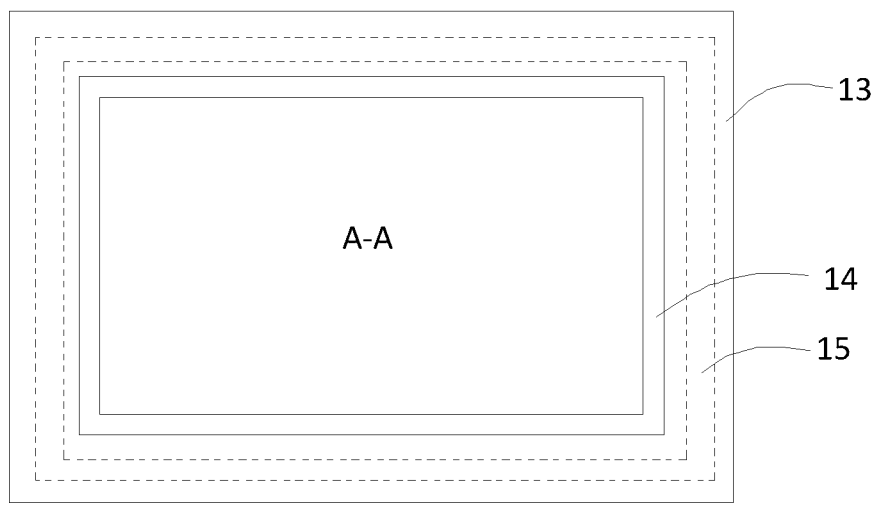
FIG. 2 is a plane diagram of a CF substrate of an existing LCD panel.
Figure 3:
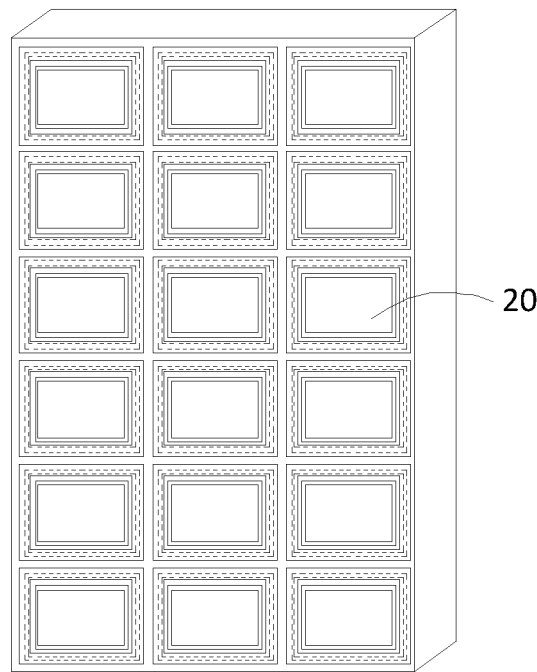
FIG. 3 is a schematic diagram of an integral LCD panel before cutting of example 1 of the invention.
Figure 4:
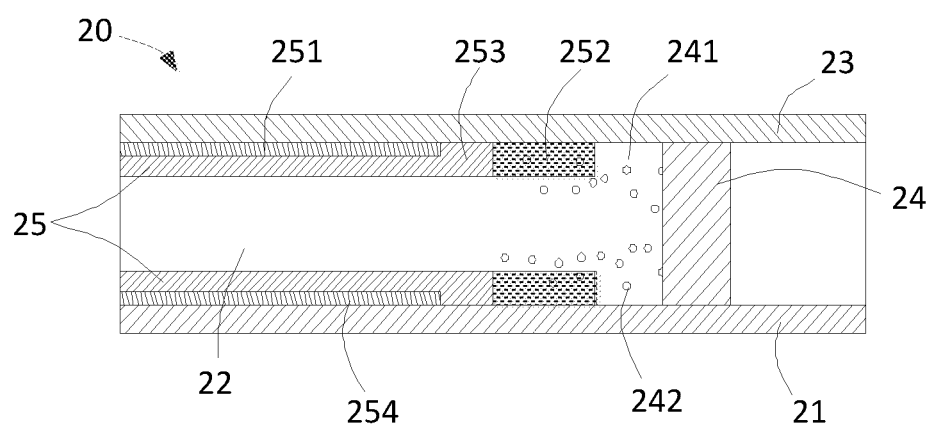
FIG. 4 is a cross-section diagram of each LCD panel shown in FIG. 3.

As shown in FIG. 3 and FIG. 4, an LCD panel 20, a preferred example 1 of the invention, comprises a TFT substrate 21, a liquid crystal 22, a CF substrate 23, and a frame adhesive 24. The liquid crystal 22 is arranged between the TFT substrate 21 and the CF substrate 23. The frame adhesive 24 is arranged between the TFT substrate 21 and the CF substrate 23 and surrounds and seals the liquid crystal 22. The TFT substrate 11 and the CF substrate 13 are correspondingly and respectively coated with a layer of oriented film 25, and the oriented films 25 are used for limiting the oriented state of the molecules of the liquid crystal 12. Each oriented film 25 comprises an ordinary oriented film 253 and a porous oriented film 252. The ordinary oriented film 253 comprises a main film 2531 located on a color film (CF) 251 and an electrode film 254, and a boundary film 2532 extending from the main film 2531 and located between the main film 2531 and the porous oriented film 252. The main film 2531 covers the effective display area. In the embodiment, a thickness of the boundary film 2532 is greater than a thickness of the main film 2531. The porous oriented film 252 is arranged around the boundary film 2532 of the ordinary oriented film 253 for adsorbing impurities in a frame adhesive area. The ordinary oriented film 253 is arranged in the middle part of the whole oriented film. The porous oriented film 252 is formed at the edge of the ordinary oriented film 253, and a spacing area is arranged between the porous oriented film 252 and the effective display area covered by the ordinary oriented film 253. The porous oriented film 252 is treated by plasma to form a porous structure so that the porous oriented film 252 can adsorb the foreign particles 242 produced by the frame adhesive 24, and then can prevent the impurities of the foreign particles 242 from permeating into the effective display area to become liquid crystal pollutants to influence the display effect of the LCD device. The frame adhesive 24 is formed on the periphery of the oriented film 25 for surrounding and sealing the liquid crystal 22, and a certain spacing area 241 is arranged between the frame adhesive 24 and the oriented film 25.

Figure 5:
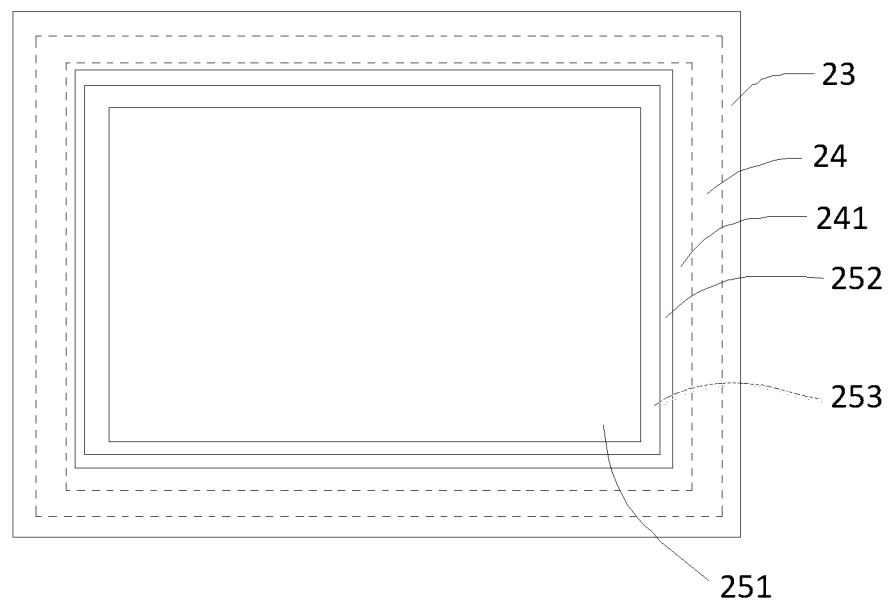
FIG. 5 is a plane diagram of a CF substrate of each LCD panel shown in FIG. 4.

Furthermore, as shown in FIG. 5, the ordinary oriented film 253 is formed in the middle part of the panel 20. The porous oriented film 252 is formed at the edge of the oriented film 25, the spacing area 253 is formed between the porous oriented film 252 and the ordinary oriented film 253, namely the spacing area 253 is formed between the porous oriented film 252 and the effective display area, to ensure that foreign particles can not enter the effective display area. The frame adhesive 24 is formed on the periphery of the oriented film 25, and the spacing area 241 is formed between the frame adhesive 24 and the oriented film 25.

When the panel 20 displays, the porous oriented film 252 can effectively adsorb the foreign particles 242 produced by the frame adhesive 24 because the porous oriented film 252 has a porous structure, to prevent the foreign particles 242 from permeating into the normal oriented film 251. Thus, the stains or non-uniform display produced by the pixel because the foreign particles 242 produced by the frame adhesive 24 permeate into the effective display area and become liquid crystal pollutants can be reduced, and the product yield and quality can be increased.

When manufacturing the LCD panel, a TFT substrate and a CF substrate are provided. Oriented films are respectively formed on the TFT substrate and the CF substrate; oriented liquid is coated in the area of the substrate requiring to be coated with oriented film by an oriented film printer; thicker alignment liquid is coated on the edge; and a film is formed after preliminary drying and hardening.

Still take the CF substrate shown in FIG. 5 as an example: a mask is manufactured in accordance with the designated area of the designed ordinary oriented film 253. The mask can cover the designed ordinary oriented film 253. The mask is covered on the CF substrate 23 formed with a film. The TFT substrate is manufactured in the same way. The uncovered edge area of the oriented film 25 is treated by plasma so that the porous oriented film 252 can be formed by the uncovered oriented film 25. The film at the edge of the oriented film 25 is thicker. Take the LCD panel shown in FIG. 4 as an example: the boundary of the oriented film 25 is formed outside the boundary of a CF film 251 and an electrode film 254, namely outside the effective display area, then the bottom layer of the oriented film 25 at the edge is not formed with other films or few films. Thus, a thick oriented film is formed at the edge. The benefit is that a thick porous oriented film 252 can be made so the oriented film 252 can effectively adsorb foreign particles.

After accomplishing the aforementioned steps, the mask is removed, and both the TFT substrate 21 and CF substrate 23 comprise an oriented film 25; the oriented film 25 comprises the ordinary oriented film 251 and the porous oriented film 252.

The subsequent steps comprise: the TFT substrate 21 and the CF substrate 23 both comprising an oriented film 25 are assembled; the liquid crystal 22 is arranged between the TFT substrate 21 and the CF substrate 23, and the frame adhesive 24 is arranged between the TFT substrate 21 and the CF substrate 23 and surrounds and seals the liquid crystal 22.

To sum up, the oriented film in the LCD panel of the invention comprises a porous oriented film; the porous oriented film can prevent the impurities in the frame adhesive area from permeating into the effective display area, can effectively prevent the impurities produced by the frame adhesive from permeating into the effective display area to become liquid crystal pollutants, and can avoid pixel to produce stains or non-uniform display. When manufacturing the oriented film on the TFT substrate, the porous oriented film at the edge of the oriented film is obtain by the combined method of printing coating, masking and plasma treating. The method has simple process, and facilitates the manufacturing of the LCD panel.

The invention is described in detail in accordance with the above contents with the specific preferred examples. However, the invention is not limited to the examples. All the equivalent structure changes or equivalent process changes which are made by using the contents of the specification and the figures of specification of the invention, or directly or indirectly used in other relevant technical fields should be considered to belong to the patent protection scope of the invention.

I claim:

1. An LCD panel, comprising a substrate, wherein the substrate is provided with an oriented film, a color film and a frame adhesive, and the frame adhesive is formed on the periphery of the oriented film; the oriented film comprises an ordinary oriented film and a porous oriented film, the ordinary oriented film comprises a main film and a boundary film, the main film is located under the color film (CF) and covers the effective display area, and the boundary film extends from the main film and locates between the main film and the porous oriented film; wherein a thickness of the boundary film is greater than a thickness of the main film, and the porous oriented film is arranged around the boundary film of the ordinary oriented film for adsorbing impurities in a frame adhesive area.

2. The LCD panel of claim 1, wherein a thickness of the porous oriented film is greater than a thickness of the main film.

3. The LCD panel of claim 1, wherein the frame adhesive is formed on the periphery of the porous oriented film, and a gap is formed between the frame adhesive and the porous oriented film.

4. An LCD device, comprising an LCD panel; wherein the LCD panel comprises a substrate; the substrate is provided with an oriented film, a color film and a frame adhesive, and the frame adhesive is formed on the periphery of the oriented film; the oriented film comprises an ordinary oriented film and a porous oriented film, the ordinary oriented film comprises a main film and a boundary film, the main film is located under the color film and covers the effective display area, the boundary film extends from the main film and locates between the main film and the porous oriented film; wherein a thickness of the boundary film is greater than a thickness of the main film, and the porous oriented film is arranged around the boundary film of the ordinary oriented film for adsorbing impurities in a frame adhesive area.

5. The LCD device of claim 4, wherein a thickness of the porous oriented film is greater than a thickness of the main film.

6. The LCD device of claim 4, wherein the frame adhesive is formed on the periphery of the porous oriented film, and a gap is formed between the frame adhesive and the porous oriented film.

7. A method for manufacturing an LCD device, comprising the following steps:

A: Forming an oriented film on a substrate of an LCD panel, wherein the oriented film comprising a main film and a boundary film extending from the main film, the main film is located under the color film (CF) and covers the effective display area, wherein a thickness of the boundary film is greater than the maim film; and B: Treating the edge of the formed boundary film to form a porous oriented film.

8. The method for manufacturing the LCD device of claim 7, wherein in the step B, the edge of the boundary film is treated by plasma.

9. The method for manufacturing the LCD device of claim 7, wherein in the step A, the boundary film is formed outside the boundary of the main film at the bottom of the oriented film to form a thick alignment film at the edge of the boundary film.

10. The method for manufacturing the LCD device of claim 9, wherein in the step B, a thicker film at the edge of the boundary film is treated to form a porous oriented film.

11. The method for manufacturing the LCD device of claim 7, wherein before the step B, the area of the oriented film which is not necessary to be treated is covered and masked.

* * * * *